United States Patent
Kavallierou et al.

(10) Patent No.: US 12,022,231 B2
(45) Date of Patent: Jun. 25, 2024

(54) VIDEO RECORDING AND PLAYBACK SYSTEMS AND METHODS

(71) Applicant: Sony Interactive Entertainment Inc., Tokyo (JP)

(72) Inventors: Michael Adam Kavallierou, London (GB); Rajeev Gupta, London (GB); David Erwan Damien Uberti, London (GB); Alexander Smith, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/865,470

(22) Filed: Jul. 15, 2022

(65) Prior Publication Data
US 2023/0015019 A1    Jan. 19, 2023

(30) Foreign Application Priority Data

Jul. 16, 2021 (GB) ..................... 2110261

(51) Int. Cl.
*H04N 5/91* (2006.01)
*G06F 3/01* (2006.01)
(Continued)

(52) U.S. Cl.
CPC ............... *H04N 5/91* (2013.01); *G06F 3/013* (2013.01); *H04N 21/41407* (2013.01); *H04N 21/437* (2013.01); *H04N 21/440245* (2013.01)

(58) Field of Classification Search
CPC .. H04N 5/91; H04N 21/41407; H04N 21/437; G06F 3/013
See application file for complete search history.

(56) References Cited

U.S. PATENT DOCUMENTS

| 9,473,758 | B1 | 10/2016 | Long |
| 2014/0139542 | A1 | 5/2014 | Plowman |

(Continued)

FOREIGN PATENT DOCUMENTS

| CN | 108322727 A | 7/2018 |
| WO | 2018125579 A1 | 7/2018 |

(Continued)

OTHER PUBLICATIONS

Combined Search and Examination Report for related GB Application No. GB2201605.9, 8 pages, dated Aug. 9, 2022.
(Continued)

*Primary Examiner* — Jefferey F Harold
*Assistant Examiner* — Alexander Boyd
(74) *Attorney, Agent, or Firm* — Matthew B. Dernier, Esq.

(57) ABSTRACT

A method includes: rendering a field of view of a virtual environment for a first user of a head mounted display, rendering a view of the virtual environment outside the field of view of the first user at a lower resolution, outputting the rendered field of view for display to the first user, and recording the combined render as a video for subsequent viewing by a second user. A corresponding method includes requesting to download or stream the video from a remote source, receiving the download or stream of the video from the remote source, and outputting at least part of the stream or video for display to a second user wearing a head mounted display.

15 Claims, 10 Drawing Sheets

(51) Int. Cl.
*H04N 21/414* (2011.01)
*H04N 21/437* (2011.01)
*H04N 21/4402* (2011.01)

(56) References Cited

U.S. PATENT DOCUMENTS

| | | | |
|---|---|---|---|
| 2016/0088282 A1* | 3/2016 | Sadi | H04N 13/111 |
| | | | 348/38 |
| 2017/0213388 A1 | 7/2017 | Margolis | |
| 2017/0236252 A1 | 8/2017 | Nguyen | |
| 2017/0244775 A1 | 8/2017 | Ha | |
| 2018/0136720 A1 | 5/2018 | Spitzer | |
| 2018/0176535 A1 | 6/2018 | Ninan | |
| 2018/0192058 A1* | 7/2018 | Chen | G06T 7/11 |
| 2018/0242017 A1 | 8/2018 | Van Leuven | |
| 2019/0014374 A1* | 1/2019 | Kunkel | H04N 13/366 |
| 2019/0026864 A1 | 1/2019 | Chen | |
| 2019/0282892 A1 | 9/2019 | Miyaki | |
| 2020/0159018 A1 | 5/2020 | Stafford | |
| 2020/0213558 A1* | 7/2020 | Tuli | H04N 13/383 |
| 2020/0330861 A1 | 10/2020 | Miyaki | |
| 2021/0065427 A1* | 3/2021 | Wade | H04N 13/388 |
| 2021/0195164 A1 | 6/2021 | Ha | |

FOREIGN PATENT DOCUMENTS

| | | | |
|---|---|---|---|
| WO | 2019068310 A1 | 4/2019 | |
| WO | WO-2023274734 A1 * | 1/2023 | |

OTHER PUBLICATIONS

Extended European Search Report for related EP Application No. 22184374, 13 pages, dated Dec. 6, 2022.
Extended European Search Report for corresponding EP Application No. 22182541.7, 14 pages, dated Dec. 6, 2022.
Combined Search and Examination Report for corresponding GB Application No. GB2110261.1, 14 pages, dated Apr. 22, 2022.
Examination Report for related GB Application No. 2201605.9, 6 pages, dated May 1, 2024.
Examination Report for corresponding GB Application No. 2110261.1, 6 pages, dated May 1, 2024.

* cited by examiner

VIDEO RECORDING AND PLAYBACK SYSTEMS AND METHODS

BACKGROUND OF THE INVENTION

Field of the Invention

The present invention relates to video recording and playback systems and methods.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Traditional videogame streaming systems such as Twitch® and other video hosting platforms such as YouTube® or Facebook® enable players of videogames to broadcast play of these games to a wide audience.

A notable difference between playing a videogame and watching a video recording of such gameplay is the passive nature of the experience, both in terms of decisions made in-game and also the viewpoint of the player (determined for example by player inputs).

This latter issue is more acute when the videogame in question is a VR or AR game, where typically a player of the game determines the viewpoint based at least in part on their own head or eye movements. Hence when watching such a VR or AR game as a live or recorded stream, the recorded images will be tracking the broadcaster's head and/or eye movements, and not the viewer's. This can lead to nausea for the viewer, and also may be frustrating if they wanted to look in a different direction to the broadcast player.

The present invention seeks to mitigate or alleviate this problem.

SUMMARY OF THE INVENTION

Various aspects and features of the present invention are defined in the appended claims and within the text of the accompanying description and include at least in a first aspect, a method of video recording; in another aspect, a method of distributing a video recording; in another aspect, a method of viewing a video recording; in a further aspect, a video recording system; and in a yet further aspect, a video playback system.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Video recording and playback systems and methods are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
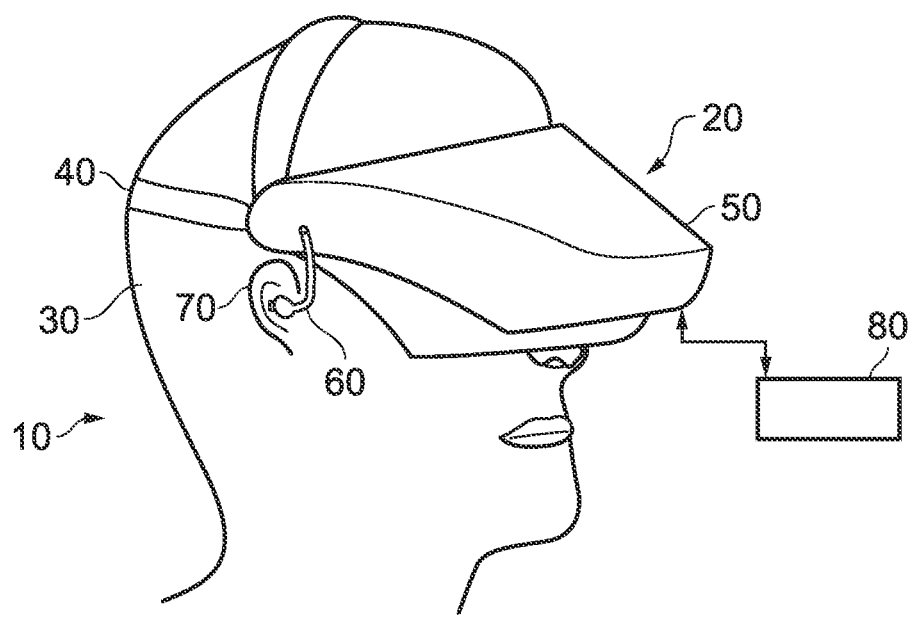
FIG. 1 schematically illustrates an HMD worn by a user.

Referring now to the drawings, wherein like reference numerals designate identical or corresponding parts throughout the several views, in FIG. 1 a user 10 is wearing an HMD 20 (as an example of a generic head-mountable apparatus—other examples including audio headphones or a head-mountable light source) on the user's head 30. The HMD comprises a frame 40, in this example formed of a rear strap and a top strap, and a display portion 50.

Optionally the HMD has associated headphone audio transducers or earpieces 60 which fit into the user's left and right ears 70. The earpieces 60 replay an audio signal provided from an external source, which may be the same as the video signal source which provides the video signal for display to the user's eyes.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer. FIG. 1 shows just one example of an HMD. Other formats are possible: for example an HMD could use a frame more similar to that associated with conventional eyeglasses.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
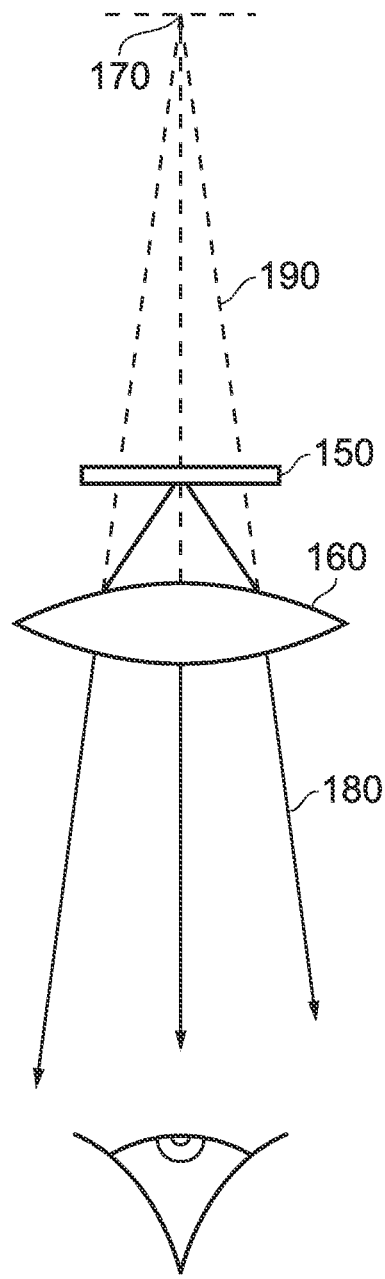
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. In FIG. 3, solid lines (such as the line 180) are used to denote real optical rays, whereas broken lines (such as the line 190) are used to denote virtual rays.

Figure 4:
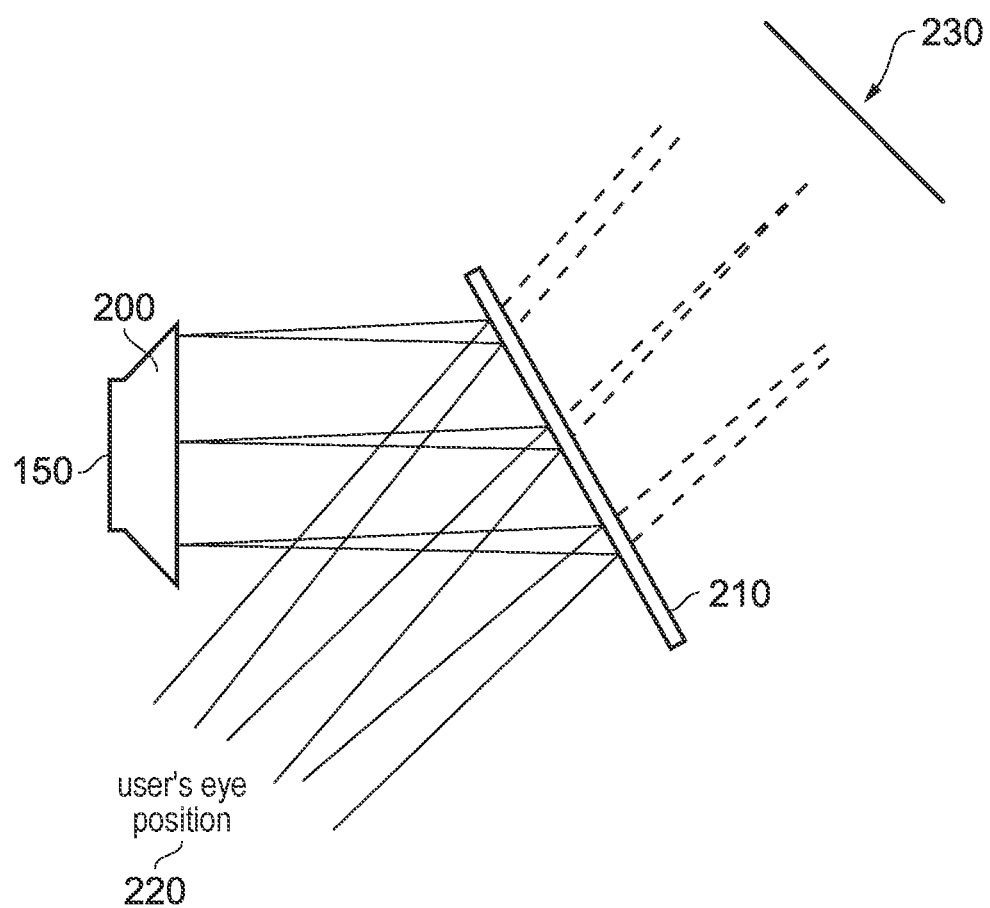
FIG. 4 schematically illustrates another type of display for use in an HMD.

An alternative arrangement is shown in FIG. 4, where the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5.

In some uses of the HMD, such as those associated with virtual reality (VR) systems, the user's viewpoint should track movements with respect to a space in which the user is located.

This tracking may employ head and/or gaze tracking. Head tracking is carried out by detecting motion of the HMD and varying the apparent viewpoint of the displayed images so that the apparent viewpoint tracks the motion. The motion tracking can use any suitable arrangement including hardware motion detectors (such as accelerometers or gyroscopes), external cameras operable to image the HMD, and outwards-facing cameras mounted onto the HMD.

Figure 6A:
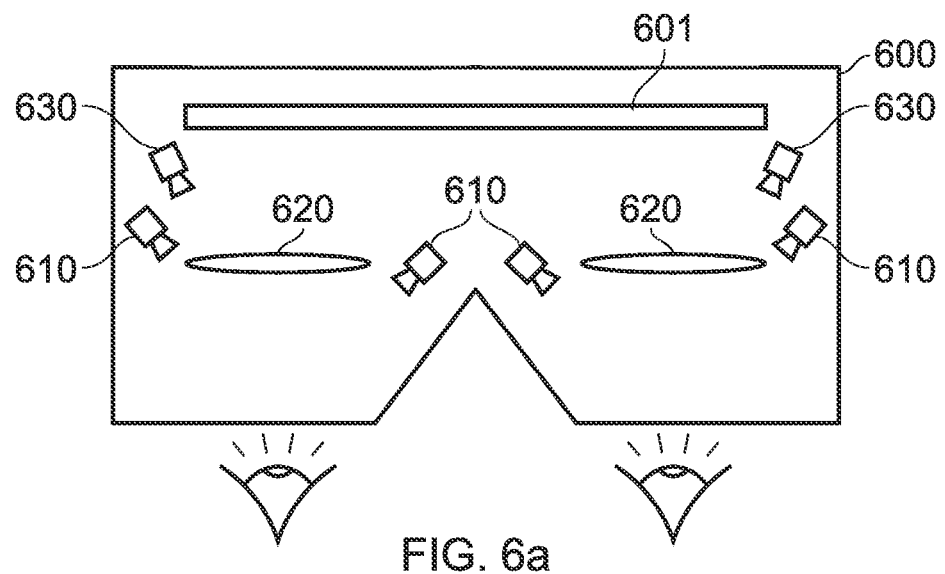
FIG. 6a schematically illustrates a plan view of an HMD.
Figure 6B:
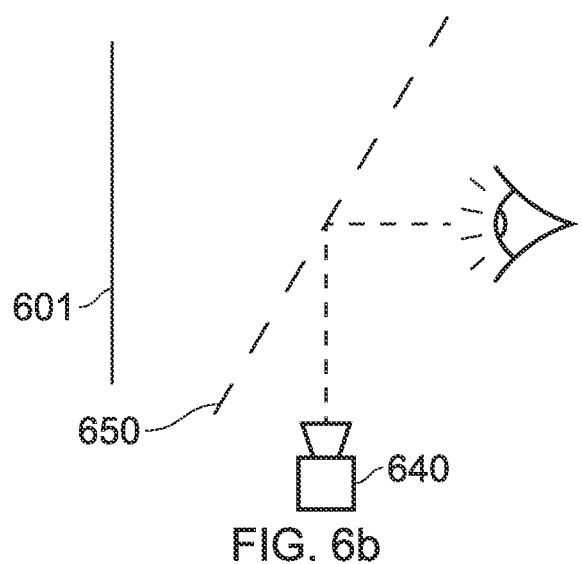
FIG. 6b schematically illustrates a near-eye tracking arrangement.

For gaze tracking, FIGS. 6a and 6b schematically illustrates two possible arrangements.

FIG. 6a shows an example of a gaze tracking arrangement in which the cameras are arranged within an HMD so as to capture images of the user's eyes from a short distance. This may be referred to as near-eye tracking, or head-mounted tracking. In this example, an HMD 600 (with a display element 601) is provided with cameras 610 that are each arranged so as to directly capture one or more images of a respective. Four cameras 610 are shown here as examples of possible positions that eye-tracking cameras may provided, though typically one camera per eye may be considered preferable. Optionally, only one eye may be tracked, on the assumption that eye motion is normally consistent between both eyes. One or more such cameras may be positioned so as to include the lens 620 in the optical path used to capture images of the eye. Examples of such positions are shown by the cameras 630. An advantage of including the lens within the optical path may be that of simplifying the physical constraints upon the design of an HMD, for example.

FIG. 6b shows an example of a gaze tracking arrangement in which the cameras are instead arranged so as to indirectly capture images of the user's eyes. FIG. 6b includes a mirror 650 arranged between a display 601 and the viewer's eye (or eyes). For the sake of clarity, any additional optics (such as lenses) are omitted in this Figure. The mirror 650 in such an arrangement is selected so as to be partially transmissive; that is, the mirror 650 should be selected so as to enable the camera 640 to obtain an image of the user's eye while the user views the display 601. One method of achieving this is to provide a mirror 650 that is reflective to IR wavelengths but transmissive to visible light—this enables IR light used for tracking to be reflected from the user's eye towards the camera 640 while the light emitted by the display 601 passes through the mirror uninterrupted. Such an arrangement may be advantageous in that the cameras may be more easily arranged out of view of the user, for instance. Further to this, improvements to the accuracy of the eye tracking may be obtained due to the fact that the camera captures images from a position that is effectively (due to the reflection) along the axis between the user's eye and the display.

Figure 7:
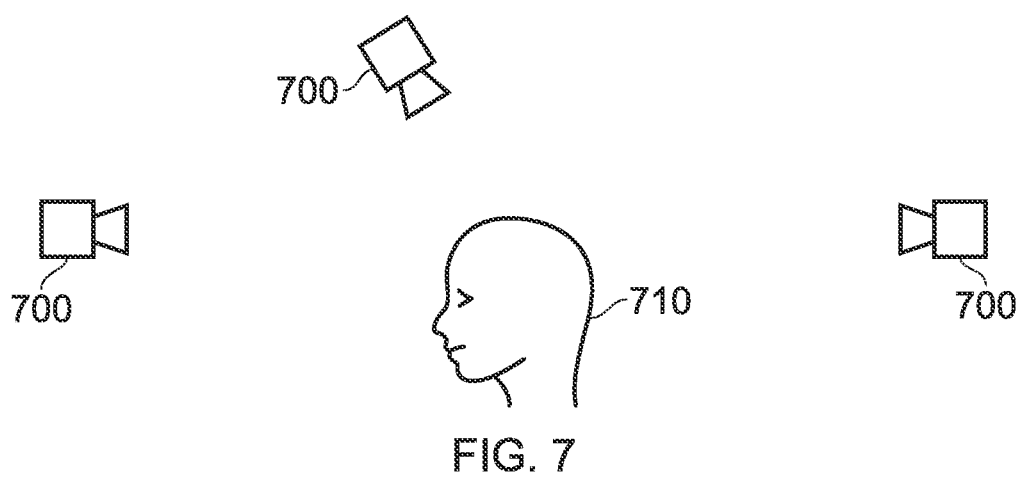
FIG. 7 schematically illustrates a remote tracking arrangement.

Alternatively, eye-tracking arrangements need not be implemented in a head-mounted or otherwise near-eye fashion as has been described above. For example, FIG. 7 schematically illustrates a system in which a camera is arranged to capture images of the user from a distance. In FIG. 7, an array of cameras 700 is provided that together provide multiple views of the user 710. These cameras are configured to capture information identifying at least the direction in which a user's 710 eyes are focused, using any suitable method.

Figure 8:
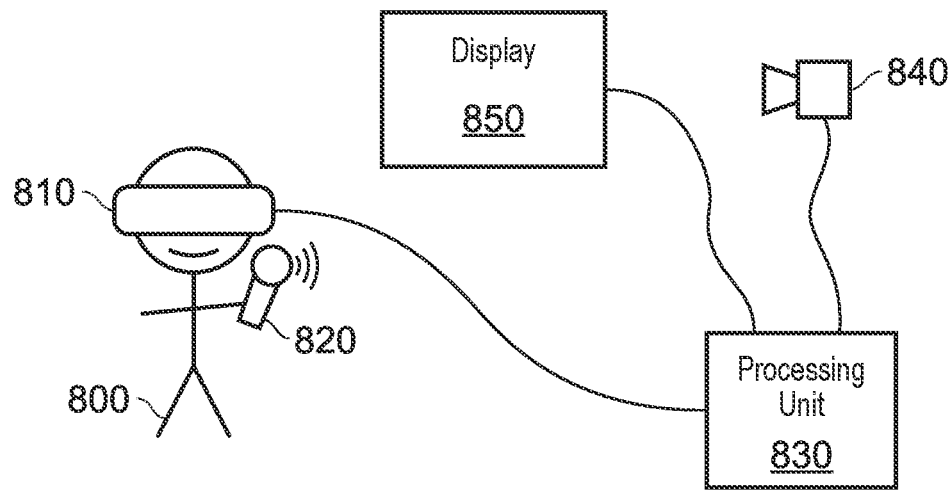
FIG. 8 schematically illustrates a gaze tracking environment.

FIG. 8 schematically illustrates an environment in which an eye-tracking process may be performed. In this example, the user 800 is using an HMD 810 that is associated with the processing unit 830, such as a games console, with the peripheral 820 allowing a user 800 to input commands to control the processing. The HMD 810 may perform eye tracking in line with an arrangement exemplified by FIG. 6a or 6b, for example—that is, the HMD 810 may comprise one or more cameras operable to capture images of either or both of the user's 800 eyes. The processing unit 830 may be operable to generate content for display at the HMD 810; although some (or all) of the content generation may be performed by processing units within the HMD 810.

The arrangement in FIG. 8 also comprises a camera 840, located outside of the HMD 810, and a display 850. In some cases, the camera 840 may be used for performing tracking of the user 800 while using the HMD 810, for example to identify body motion or a head orientation. Meanwhile in alternative arrangements, the camera 840 may instead be mounted on the HMD facing outward, to determine HMD motion based on motion within the captured video.

The processing required to generate tracking information from captured images of the user's 800 eye or eyes may be performed locally by the HMD 810, or the captured images or results of one or more detections may be transmitted to an external device (such a the processing unit 830) for processing. In the former case, the HMD 810 may output the results of the processing to the external device.

Figure 9:
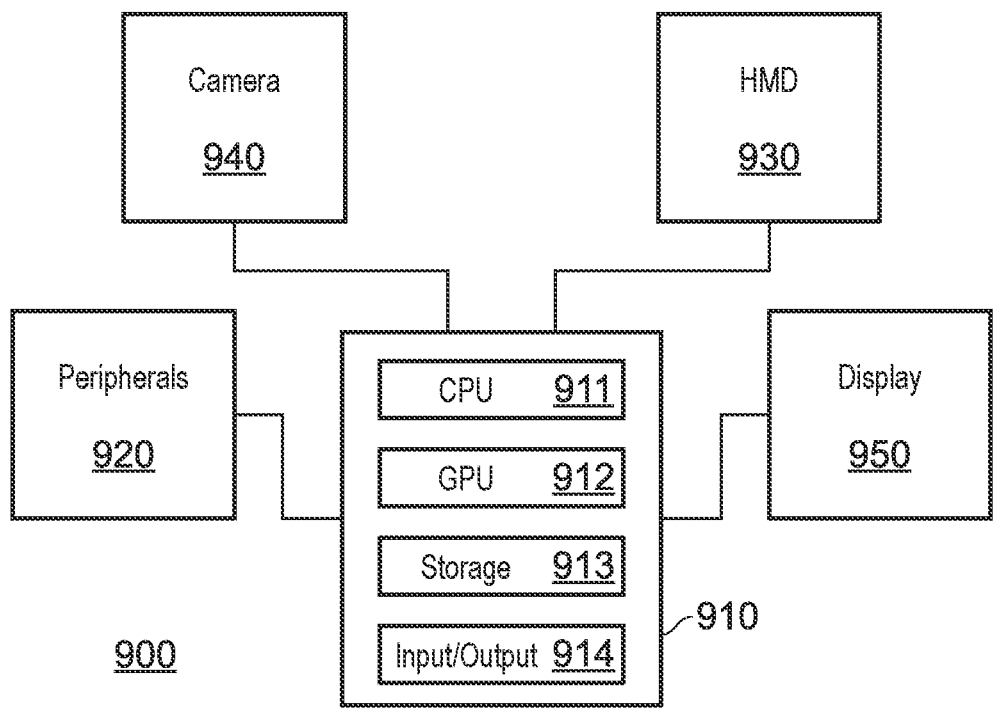
FIG. 9 schematically illustrates a gaze tracking system.

FIG. 9 schematically illustrates a system for performing one or more eye tracking and head tracking processes, for example in system such as that discussed above with reference to FIG. 8. The system 900 comprises a processing device 910, one or more peripherals 920, an HMD 930, a camera 940, and a display 950.

As shown in FIG. 9, the processing device 910 may comprise one or more of a central processing unit (CPU) 911, a graphics processing unit (GPU) 912, storage (such as a hard drive, or any other suitable data storage medium) 913, and an input/output 914. These units may be provided in the form of a personal computer, a games console, or any other suitable processing device.

For example, the CPU 911 may be configured to generate tracking data from one or more input images of the user's eyes from one or more cameras, or from data that is indicative of a user's eye direction. This may be data that is obtained from processing images of the user's eye at a remote device, for example. Of course, should the tracking data be generated elsewhere then such processing would not be necessary at the processing device 910.

Alternatively or in addition, one or more cameras (other than a gaze tracking camera) may be used to track head motion as described elsewhere herein, as may any other suitable motion tracker such as an accelerometer within the HMD, as described elsewhere herein.

The GPU 912 may be configured to generate content for display to the user on which the eye and/or head tracking is being performed.

The content itself may be modified in dependence upon the tracking data that is obtained—an example of this is the generation of content in accordance with a foveal rendering technique. Of course, such content generation processes may be performed elsewhere—for example, an HMD 930 may have an on-board GPU that is operable to generate content in dependence upon the eye tracking and/or head motion data.

The storage 913 may be provided so as to store any suitable information. Examples of such information include program data, content generation data, and eye and/or head tracking model data. In some cases, such information may be stored remotely such as on a server, and so storage 913 may be local or remote, or a combination of the two.

Such storage may also be used to record the generated contact, as discussed elsewhere herein.

The input/output 914 may be configured to perform any suitable communication as appropriate for the processing device 910. Examples of such communication include the transmission of content to the HMD 930 and/or display 950, the reception of eye-tracking data, head tracking data, and/or images from the HMD 930 and/or the camera 940, and communication with one or more remote servers (for example, via the internet).

As discussed elsewhere, the peripherals 920 may be provided to allow a user to provide inputs to the processing device 910 in order to control processing or otherwise interact with generated content. This may be in the form of button presses or the like, or alternatively via tracked motion to enable gestures to be used as inputs.

Figure 2:
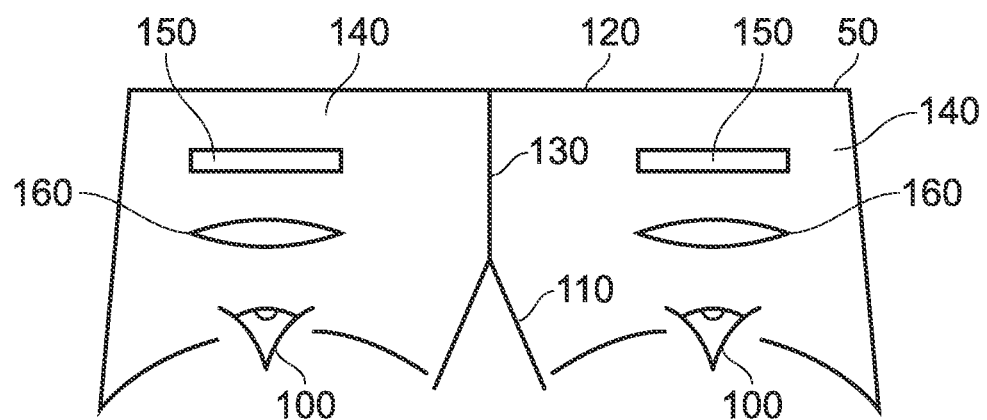
FIG. 2 is a schematic plan view of an HMD.

The HMD 930 may be configured in accordance with the discussion of the corresponding elements above with respect to FIG. 2. The camera 940 and display 950 may be configured in accordance with the discussion of the corresponding elements above with respect to FIG. 8.

Figure 10:
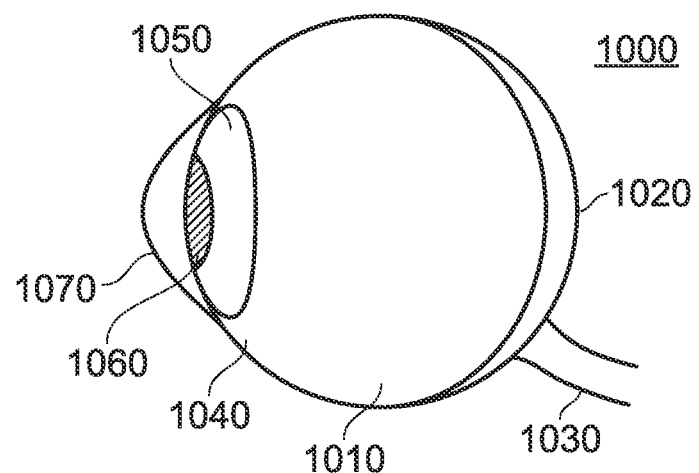
FIG. 10 schematically illustrates a human eye.

Referring now to FIG. 10, it will be understood that the human eye does not have a uniform structure; that is, the eye is not a perfect sphere, and different parts of the eye have different characteristics (such as varying reflectance or colour). FIG. 10 shows a simplified side view of the structure of a typical eye 1000; this Figure has omitted features such as the muscles which control eye motion for the sake of clarity.

The eye 1000 is formed of a near-spherical structure filled with an aqueous solution 1010, with a retina 1020 formed on the rear surface of the eye 1000. The optic nerve 1030 is connected at the rear of the eye 1000. Images are formed on the retina 1020 by light entering the eye 1000, and corresponding signals carrying visual information are transmitted from the retina 1020 to the brain via the optic nerve 1030.

Turning to the front surface of the eye 1000, the sclera 1040 (commonly referred to as the white of the eye) surrounds the iris 1050. The iris 1050 controls the size of the pupil 1060, which is an aperture through which light enters the eye 1000. The iris 1050 and pupil 1060 are covered by the cornea 1070, which is a transparent layer which can refract light entering the eye 1000. The eye 1000 also comprises a lens (not shown) that is present behind the iris 1050 that may be controlled to adjust the focus of the light entering the eye 1000.

The structure of the eye is such that there is an area of high visual acuity (the fovea), with a sharp drop off either side of this. This is illustrated by the curve 1100 of FIG. 11, with the peak in the centre representing the foveal region. The area 1110 is the 'blind spot'; this is an area in which the eye has no visual acuity as it corresponds to the area where the optic nerve meets the retina. The periphery (that is, the viewing angles furthest from the fovea) is not particularly sensitive colour or detail, and instead is used to detect motion.

As also described elsewhere herein, foveal rendering (or foveated rendering) is a rendering technique that takes advantage of the relatively small size (around 2.5 to 5 degrees) of the fovea and the sharp fall-off in acuity outside of that.

Conventional techniques for foveated rendering typically require multiple render passes to allow an image frame to be rendered multiple times at different image resolutions so that the resulting renders are then composited together to achieve regions of different image resolution in an image frame. The use of multiple render passes requires significant processing overhead and undesirable image artefacts can arise at the boundaries between the regions.

Alternatively, in some cases hardware can be used that allows rendering at different resolutions in different parts of an image frame without needing additional render passes (so called flexible scale rasterization). Such hardware-accelerated implementations may therefore be better in terms of performance when such hardware is available for use.

Figure 12A:
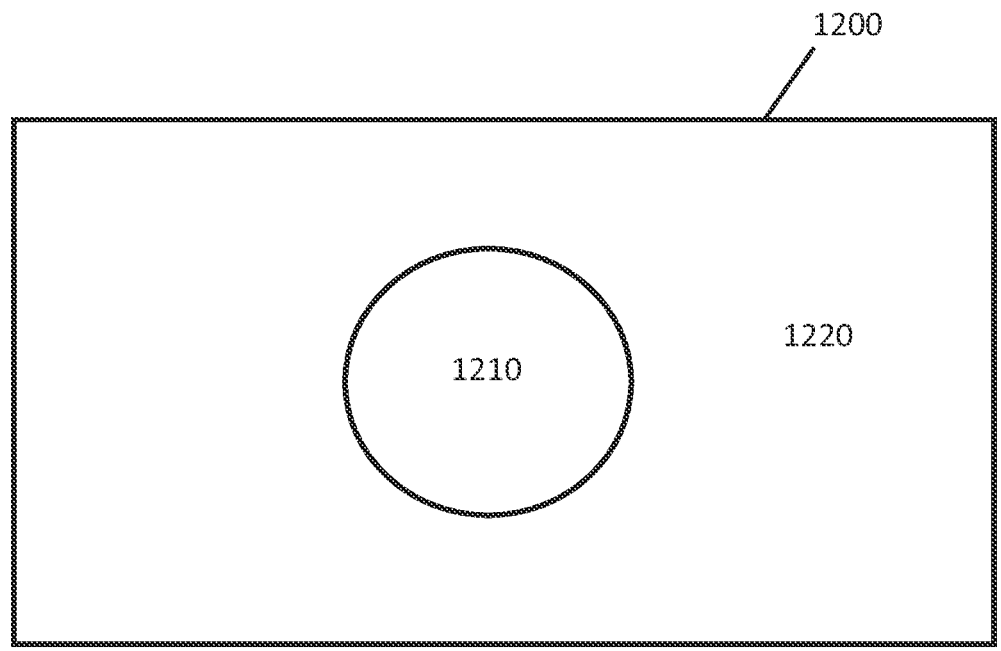
FIGS. 12a and 12b schematically illustrate foveated rendering.

Turning now to FIG. 12*a*, this schematically illustrates foveated rendering for a displayed scene 1200. The user gazes in the direction of a region of interest to them. The direction of gaze is tracked as described elsewhere herein and in this case for the purposes of illustration is directed at the centre of the displayed field of view. Consequently an area 1210 roughly corresponding to the high resolution fovea region of the user's eyes is rendered at a high resolution, whilst a peripheral area 1220 is rendered at a lower resolution.

Because of the gaze tracking, the high-resolution region of the image is projected onto the high acuity fovea region of the user's eye, whilst the lower resolution regions of the image are projected onto the lower acuity regions of the user's eye. By continually tracking the user's gaze and rendering in this manner, the user is fooled into thinking that the entire image is high-resolution, because it always appears to be within the high-resolution portion of the user's own vision. However in fact typically the majority of the image is actually being rendered at a lower resolution. In this way the computational overhead of rendering the complete image can be greatly reduced.

This can be beneficial for several reasons. Firstly for the same computational budget, richer, more complex and/or more detailed graphics can be presented to the user then previously, and/or for the same computational budget, rather than rendering a single image (such as may be displayed on a television), it becomes possible to render two images (for example a left and right image forming a stereoscopic pair for a head mounted display). Secondly, the amount of data to be transmitted to a display such as the HMD can be reduced, and optionally any post-processing of the image(s) at the HMD (such as for example re-projection) may also be computationally less expensive.

Figure 11:
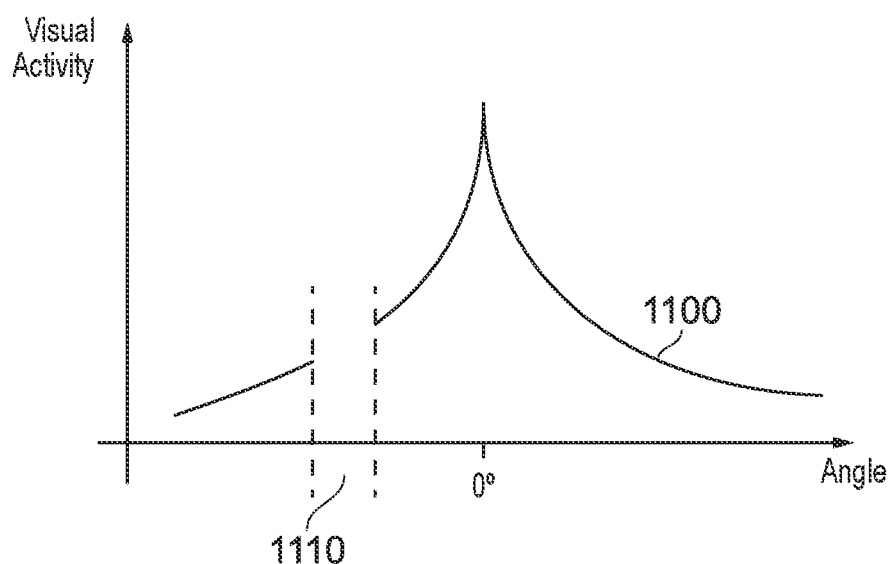
FIG. 11 schematically illustrates a graph of human visual acuity.
Figure 12B:
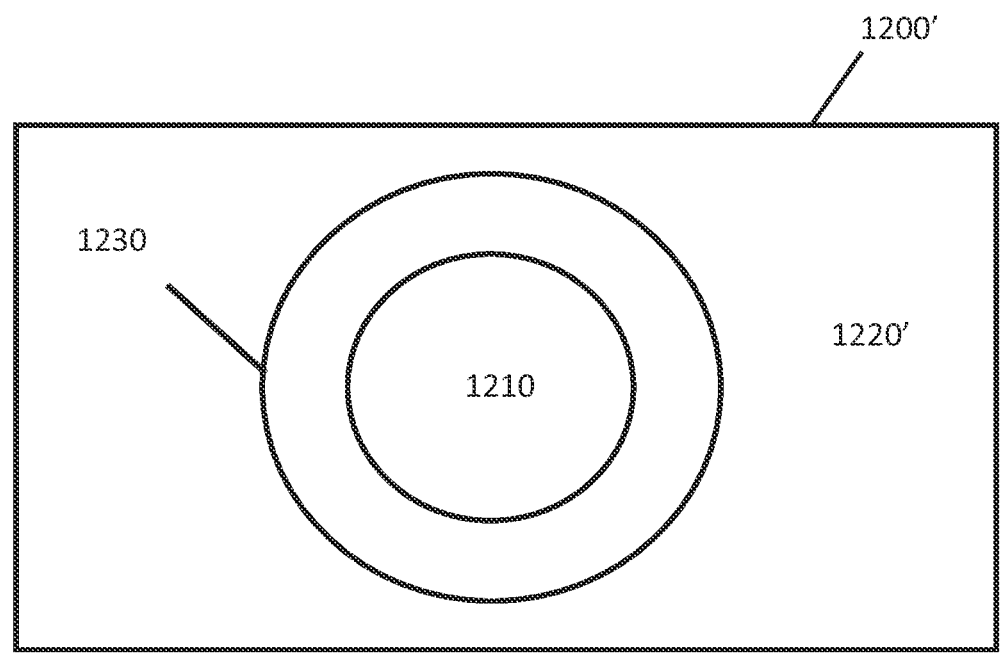

Turning now to FIG. 12b, in recognition of the fact that the drop off in visual acuity from the fovea area of the eye is a smooth progression as seen in FIG. 11, optionally foveated rendering can implement a multi-step or graded change in resolution between the fovea region and the peripheral region of the image.

Hence for a variant rendering of the displayed scene 1200', the foveal area 1210 is surrounded by a transition region 1230 disposed between the fovea region and a reduced peripheral region 1220'.

This transition region may be rendered at an intermediate resolution between the resolution of the fovea region and the resolution of the peripheral region.

Figure 13A:
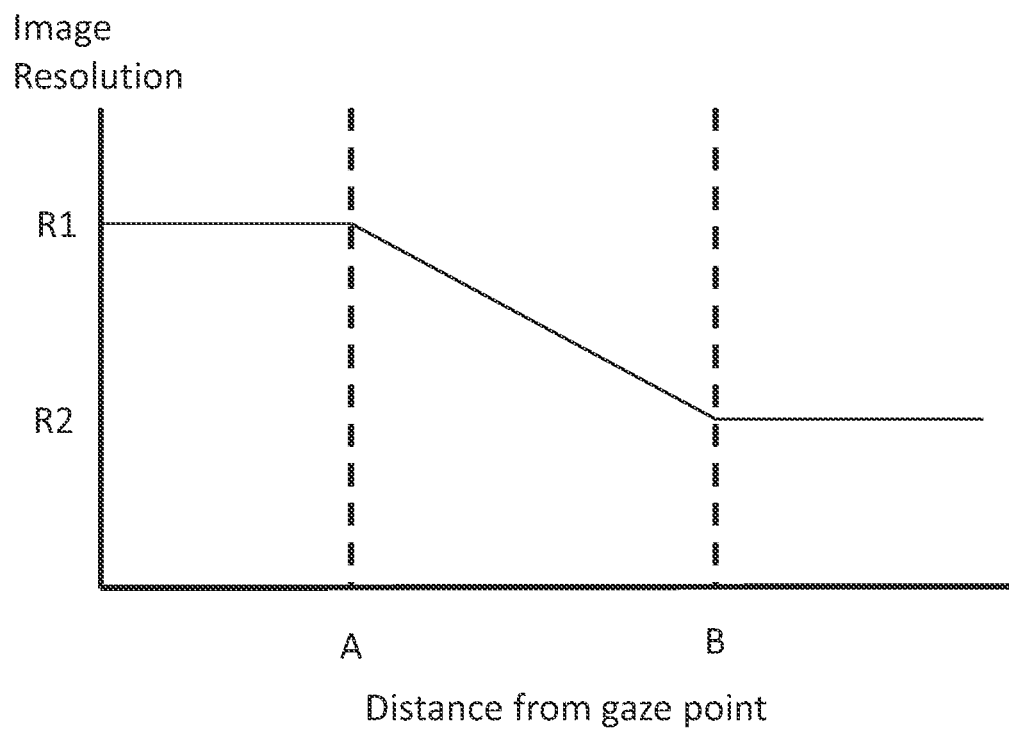
FIGS. 13a and 13b schematically illustrate resolution transition.
Figure 13B:
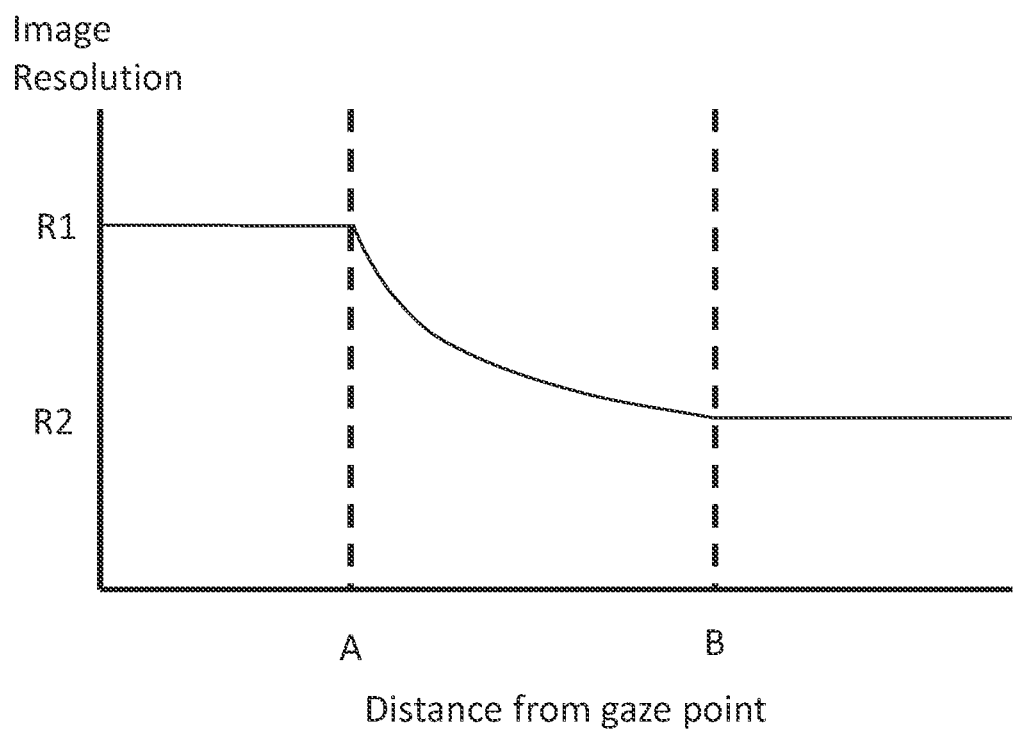

Referring now also to FIGS. 13a and 13b, alternatively it may be rendered as a function of distance from the estimated gaze position. This may be achieved for example using a pixel mask with increasingly sparse pixels as a function of distance that indicate the corresponding image pixel should be rendered, with remaining pixels filled in blended according to nearby rendered colours. Alternatively may be achieved by a suitable resolution distribution curve, in a flexible scale rasterisation system. FIG. 13a shows a linear progression between resolutions, whilst FIG. 13B shows a nonlinear progression chosen to echo the nonlinear reduction in acuity away from the fovea in the users eye. The second approach reduces the resolution slightly more quickly, thereby saving slightly more computational overhead.

Hence will be appreciated that where gaze tracking is made possible (for example by use of one or more gaze tracking cameras and subsequent computation of the direction of gaze of the user and hence the position of gaze on the virtual image), then optionally foveated rendering may be employed either to maintain the illusion of high-resolution images whilst reducing computationally overhead of image production, increasing the available image quality at least in the foveated region, and/or providing a second viewpoint (for example to generate a stereoscopic pair) for less than double the cost of generating two conventional images.

Furthermore, when wearing an HMD, it will be appreciated that if the gaze region 1210 is the displayed region of most interest based on eye gaze, then the overall rendered scene 1200 is the displayed region of general interest based on head position; that is to say, the displayed field of view 1200 is responsive to the user's head position whilst wearing the HMD, whilst any foveated rendering within that field of view is responsive to the user's gaze position.

In effect the periphery of the displayed field of view 1200 can be thought of as being rendered in the special case of a resolution of zero (i.e. not actually rendered), since normally it is impossible for the user to see outside the displayed field of view.

Figure 14A:
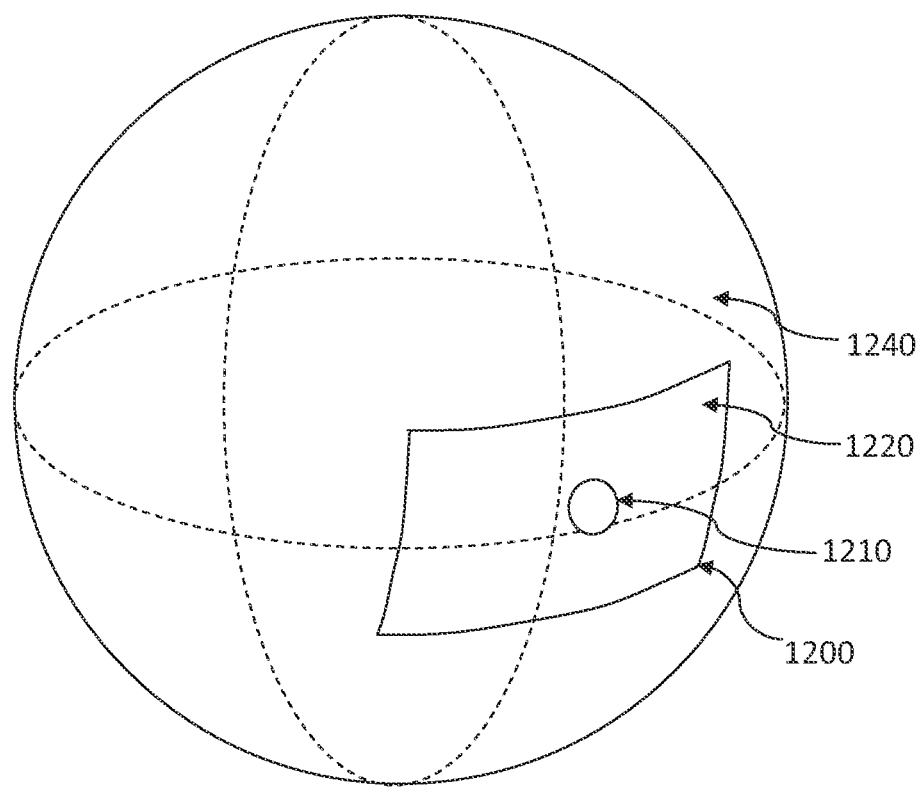
FIGS. 14a and 14b schematically illustrate a an extended rendering scheme in accordance with embodiments of the present application.

However, in the event that a second person wishes to look at a recording of gameplay of the user, by wearing an HMD of their own, whilst they may well look at the same content as the original user, this is not guaranteed. Therefore in an embodiment of the description, and referring now to FIG. 14a, the principle of foveated rendering can be extended to a region beyond the field of view 1200 displayed to the original user, in order to render a yet lower resolution view of the further peripheral outside the original user's field of view. This lower resolution view will not normally be seen by the original user (since they are only presented with the current field of view 1200), but may nevertheless be rendered using the same techniques used for foveated rendering within the current field of view, as part of the same rendering pipeline.

Hence in practice the games machine or other rendering source now renders a superset of the displayed image 1200. Optionally, it renders a high resolution foveal region 1210. It then renders a peripheral region 1220 within the field of view displayed to the user, optionally with a transitional region 1230 (not shown in FIG. 14a), and then renders a further peripheral region 1240, outside the field of view displayed to the user. It will be understood that 'rendering' in this context means generating image data capable of being displayed (and/or recorded) or more generally ready for immediately or eventually viewable output in some form.

This further peripheral region is typically a sphere (or more precisely, completes a sphere) notionally centred at the user's head, and is rendered at a lower resolution than the peripheral region 1220 within the field of view displayed to the user.

Figure 14B:
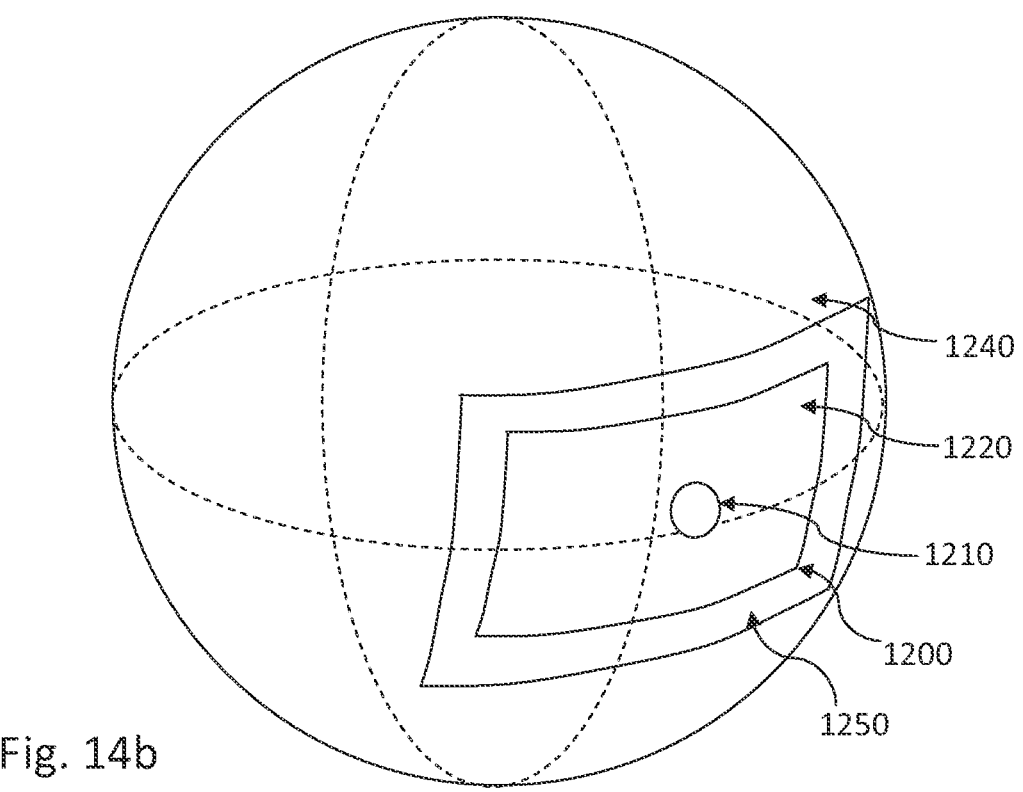

Referring now to FIG. 14B optionally, in a manner similar to the transitional region shown in FIG. 12b, a transitional region 1250 may be implemented in a region around the field of view displayed to the user in which the resolution of the peripheral region 1220 within the field of view displayed to the user is ramped down to a lower resolution for the spherical further peripheral region. Again this may be an intermediate resolution or a linear or non-linear ramp. The relative size of the transitional region may be a matter of design choice, or may be determined empirically; for example viewers of a recording of the original user who wish to track the original users head movements (typically because the original user was tracking objects or events of interest within the game) may not perfectly track the originally displayed field of view due to finite reaction times. Consequently the size of the transitional region may be chosen based on the comparative lag in tracking the field of view displayed to the user as it moves around a notional sphere. This lag in turn may be a function of the size and speed of movement of the field of view; hence for example if the original user moves their head quickly and/or a large distance, the transitional region 1250 may be temporarily larger, the size being a function of the speed and/or distance, and optionally also a function of overall available computational budget (in this case, optionally the resolution of the remainder of spherical further region may be temporarily reduced to maintain an overall computational budget). Conversely, when the original users field of view is relatively fixed, the transitional region may be relatively small, for example sufficient to accommodate micro-movements of subsequent viewers heads, and/or to accommodate different (and possibly larger) fields of view of subsequent head mounted displays (for example, where a recording was created using a first-generation head mounted display with a field of view of 110°, the transitional region may try to extend to 120° in anticipation of a second generation head mounted display with a wider field of view).

The spherical image may be rendered for example as a cube map, or using any other suitable technique for spherical scene rendering, within the rendering pipeline.

As noted elsewhere herein, the original user only sees the displayed field of view 1200, itself optionally comprising a high resolution foveal region, an optional transitional region, and a peripheral region, or where for example the head mounted display does not comprise gaze tracking, then a displayed field of view with a predetermined resolution. The remainder of the rendered spherical image is not seen by the original user, and is rendered at a lower resolution, optionally with a transitional region between the displayed field of view and the remains of the sphere.

In this rendering scheme therefore the displayed field of view can be thought of as a head based foveated rendering scheme rather than a gaze based foveated rendering scheme, with the comparatively high resolution displayed field of view moving around the overall rendered sphere as the user moves their head whilst optionally the same time a higher resolution region moves around within the displayed field of view as the user moves their gaze. The original user only sees the displayed field of view, but subsequent viewers of the recording of the rendered image have potential access to the entire sphere independent of the original user's displayed field of view within that sphere.

Hence whilst typically they may attempt to track the user's displayed field of view, they are free to look elsewhere within the spherical image to either enjoy the surroundings, look at something that the original user was not interested in, or simply obtain a greater sense of immersion when their own current field of view does not exactly align with that of the original user.

The full image (being a spherical superset of the image displayed to the original user) may be recorded for example in a circular buffer, in a similar manner to how a conventional displayed image may be recorded in a circular buffer of a games machine. For example a hard disk, solid state disk, and/or RAM of the games machine may be used to record 1, 5, 15, 30, or 60 minutes of footage of the full image, with new footage overwriting the oldest footage unless the user specifically indicates they wish to save/archive recorded material, in which case it may be duplicated to a separate file in the hard disc or solid state disk, or uploaded to a server. Similarly the full image may be broadcast live by being uploaded to a broadcast distribution server, or may be broadcast or uploaded from the circular buffer or from a saved file at a later time by similarly uploading to a broadcast or video distribution server.

The result is a spherical image in which a higher resolution region corresponds to the displayed field of view of the original user as they move their head around is wearing an HMD, and optionally within that high resolution region a still higher resolution region corresponds to the position of their gaze within that displayed field of view.

Optionally, metadata may be recorded with the spherical image, either as part of the video recording or as a companion file, which indicates where within the spherical image the displayed field of view is located. This may be used for example to assist a subsequent viewer; if a subsequent viewer gets disorientated or loses track of where the originally displayed field of view has moved (for example if watching a space battle and the original user's spaceship shoots out of view, they may be relatively few visible points of reference for a subsequent viewer to use to navigate towards where the spaceship—and the original users point of view—now is. In this case, a navigation tool such as an arrow pointing in the current direction of the originally displayed field of view, or a glow at the respective edge of the periphery of the subsequent viewers own field of view may guide them back towards the highest resolution parts of the recorded image.

In this way, a subsequent user may have the confidence to look around the scene knowing that they can find their way back to the originally displayed field of view, even if this changes position whilst they are looking away.

One possible reason for looking around the scene is that other events are occurring, or other objects exist within the virtual environment, that the original user was not attending to or was not interested in. A subsequent user may have more interest in these.

Accordingly, optionally the games machine (or a game or other application running thereon) may maintain a list, table or other associated data indicating an expected degree of interest in particular objects or environmental elements such as non-player characters, and/or maintain similar data indicating an expected degree of interest in particular events, such as the appearance of an object or character, or an explosion, or part of a scripted event that is tagged to be of likely interest.

In such cases, where such objects or events occur within the spherical image outside the displayed field of view of the original user, the area within the spherical image corresponding to such an object or event may itself be rendered at a comparatively higher resolution (for example resolution corresponding to partway through transitional region 1250, or originally displayed peripheral region 1220, optionally with other parts of the spherical image being rendered at a lower resolution to maintain an overall computational budget. Optionally the resolution boost may be made a function of a degree of interest associated with the object or event (for example no, low, or high interest objects or events may be boosted by nothing, a first or a second higher amount, respectively).

Such objects or events may also have a transitional region similar to 1230 or 1250 around them to provide a visually smooth transition into the remaining spherical image. In this way, objects or events of interest not viewed by the original user may still be viewed by subsequent viewers, with an improved resolution relative to lower interest parts of the spherical image.

Optionally, the above scheme, whereby the principle of foveated rendering is extended past the field of view of the original user to add a further peripheral region or regions forming a sphere (or other circular panoramic, such as a cylinder), or similarly where (if true foveated rendering is not used, e.g. because there is no gaze tracking), then the principle is similarly applied outside the field of view of the original user, may be turned on or off by one or more of the user, the application generating the rendered environment, the operating system of the games console, or a helper app (e.g. an app dedicated to broadcast/streaming uploads).

For example, the above scheme(s) may be disabled by default, as they represent a computational overhead that is not needed if the current game play is not to be streamed or broadcast. The scheme may then be provided as an option to the user to turn on if they intend to broadcast or stream in this manner in future, or in response to an indication to commence a streaming upload.

Similarly, the game or app generating the rendered environment may activate the scheme, for example in response to in game events, or particular levels or cut-scenes, where it is considered more likely that an audience may wish to look around in different directions to the original user.

Variants

The above schemes increase computational overhead by requiring that more of the scene is rendered, albeit generally at a lower resolution that the scene within the field of view displayed to the original user.

To mitigate this, the part of the scene rendered outside the field of view displayed to the original user, or optionally outside a transition region 1250 bounding the originally displayed field of view, may be rendered at a lower frame rate than the field of view and optionally the transition region.

Hence for example the field of view may be rendered at 60 frames per second (fps), whilst the remainder of the sphere is rendered at 30 fps, optionally at a higher resolution than if rendered at 60 fps, if the computational budget allows.

Optionally, a server to which the resulting recording is uploaded may then interpolate the frames of the remainder of the sphere to boost the frame rate back up to 60 fps.

Hence more generally the remainder of the sphere (optionally including a transition region around the original field of view) is rendered at a fraction of the frame rate of the original displayed field of view (typically ½ or ½), and this part of the image is then frame-interpolated, either by the games machine or by a server to which the recording is sent.

Alternatively or in addition to separate temporal/frame interpolation to compensate for reduced frame rates, separate spatial interpolation may be used to compensate for reduced image resolution. This may be achieved using offline processing e.g. at the games machine or server as above, optionally using information from successive frames, and/or information from the original field of view as it moves around the scene (thereby providing higher resolution reference pixels that can subsequently replace or inform the processing of low resolution rendered parts). Optionally a machine learning system can be trained to upscale the video, having been trained on low and higher resolution walk-throughs of the game environment that may be generated for example by the developer moving through the environment and rendering the image sphere at a target resolution (irrespective of resulting frame rate/time taken, as this is not for the purposes of game play).

Hence the recorded video comprising the remaining sphere may in principle have reduced temporal and spatial resolutions that are compensated for, at least in part, by parallel or subsequent processing by the games machine and/or a holding/distribution server.

The server can then provide the (spatial and/or temporal) up-scaled video images, or indeed the originally uploaded video images if no variant is applied, to one or more viewers (or to a further server that provides this function).

The viewers can then look at the video using an app on their client device, and either track the original user's viewpoint or freely look around, as described elsewhere herein.

Summary Embodiments

Figure 15:
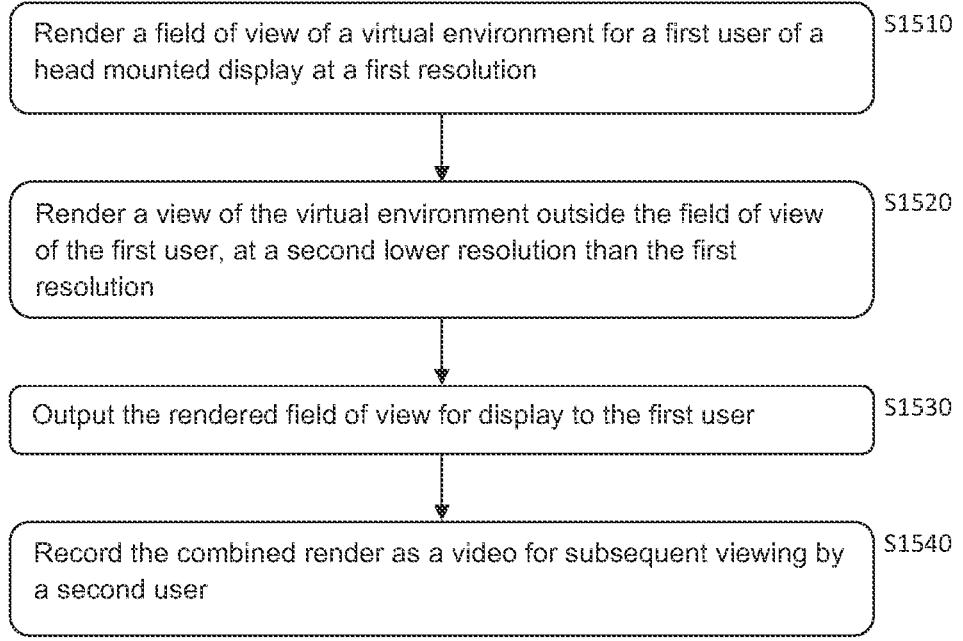
FIG. 15 is a flow diagram of a method of video recording in accordance with embodiments of the present application.

Referring now to FIG. 15, in a summary embodiment of the present description a method of video recording comprises the following steps.

In a first step S1510, rendering a field of view of a virtual environment for a first user of a head mounted display at a first resolution, as described elsewhere herein.

In a second step S1520, rendering a view of the virtual environment outside the field of view of the first user, at a second lower resolution than the first resolution, as described elsewhere herein.

In a third step S1530, outputting the rendered field of view for display to the first user, as described elsewhere herein.

And in a fourth step S1540, recording the combined render as a video for subsequent viewing by a second user, as described elsewhere herein.

It will be appreciated that in principle the third and fourth steps are interchangeable, and furthermore optionally the third step may precede or occur in parallel with the second step. Similarly the fourth step may be incremental based on the renderings of the first and second steps.

It will be apparent to a person skilled in the art that variations in the above method corresponding to operation of the various embodiments of the method and/or apparatus as described and claimed herein are considered within the scope of the present disclosure, including but not limited to that:

- the method comprises the step of rendering within the field of view a foveated region of the virtual environment, based on tracking the gaze of the first user, at a third resolution higher than the first resolution, as described elsewhere herein.
- the step of rendering a view of the virtual environment outside the field of view of the first user completes a spherical or cylindrical view of the virtual environment, as described elsewhere herein.
- The method comprises the step of rendering outside the field of view a transitional region bounding the rendered field of view and having one or more resolutions between the first and second resolutions, as described elsewhere herein.
- The size of the transitional region bounding the rendered field of view is dependent upon one or more selected from the list consisting of difference in position of the rendered field of view between successive image frames, the rate of change of position of the rendered field of view between successive image frames, variance in position of the rendered field of view caused by micro-motions of the first user's head, and expected variance in position caused by micro-motions of the second user's head, as described elsewhere herein.
- The method comprises the step of rendering, within the rendered view of the virtual environment outside the field of view of the first user, an object or event identified as being of interest within the environment, at a higher resolution than the second resolution, the remainder of the rendered view of the virtual environment outside the field of view of the first user remaining at the second resolution, as described elsewhere herein.
- The step of rendering the view of the virtual environment outside the field of view of the first user is dependent upon selection of this function by one or more selected from the list consisting of the first user, an application rendering the virtual environment, an operating system of the device rendering the virtual environment, and a helper application for the operating system of the device rendering the virtual environment, as described elsewhere herein.
- The method comprises the steps of obtaining the recorded video comprising a rendered field of view of a virtual environment of a first user of a head mounted display at a first resolution and a rendered view of the virtual environment outside the field of view of the first user at a second resolution lower than the first resolution, and increasing one or more selected from the list consisting of a special resolution of the recording of the rendered view the virtual environment outside the field of view of the first user, and a temporal resolution of the recording of the rendered view the virtual environment outside the field of view of the first user, as described elsewhere herein.

Meanwhile, a method of distributing a video recording that was recorded using the method of the summary embodiment (and hence comprises a rendered field of view of a virtual environment of a first user of a head mounted display at a first resolution and a rendered view of the virtual environment outside the field of view of the first user at a second resolution lower than the first resolution), comprises in turn the steps of receiving a request to download or stream the video recording to a second user, and downloading or streaming the video to the second user, as described elsewhere herein.

In this case, optionally this method comprises the step of, prior to distribution, increasing one or more selected from the list consisting of a special resolution of the recording of the rendered view the virtual environment outside the field of view of the first user, and a temporal resolution of the recording of the rendered view the virtual environment outside the field of view of the first user, as described elsewhere herein.

Figure 16:
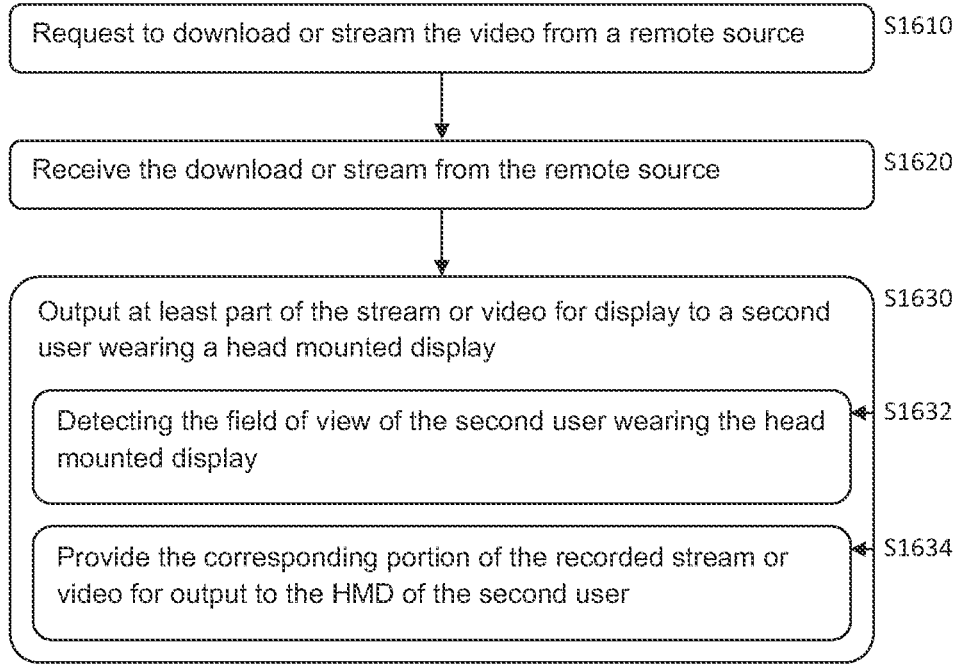
FIG. 16 is a flow diagram of a method of video playback in accordance with embodiments of the present application.

Turning now to FIG. 16, in a summary embodiment of the present description a method of viewing a video recording (comprising a rendered field of view of a virtual environment of a first user of a head mounted display a first resolution and a rendered view of the virtual environment outside the field of view of the first user at a second resolution lower than the first resolution), comprises the following steps.

In a first step s1610, requesting to download or stream the video from a remote source (such as a broadcast or streaming server, or potentially a peer-to-peer server or game console), as described elsewhere herein.

In a second step S1620, receiving the download or stream of the video from the remote source, as described elsewhere herein.

In a third step S1630, outputting at least part of the stream or video for display to a second user wearing a head mounted display, as described elsewhere herein.

Meanwhile the step of outputting the stream of video comprises the following sub-steps.

In a first sub-step S1632, detecting the field of view of the second user wearing the head mounted display, as described elsewhere herein.

And in a second sub-step S1634, providing the corresponding portion of the recorded stream or video for output to the head mounted display of the second user, as described elsewhere herein.

Again, it will be apparent to a person skilled in the art that variations in the above method corresponding to operation of the various embodiments of the method and/or apparatus as described and claimed herein are considered within the scope of the present disclosure, including but not limited to that:

the method comprises the steps of calculating, from data associated with the video recording, the relative position of the second user's current field of view to the corresponding field of view of the first user, and if the relative positions of these fields of view differ by more than the threshold amount, then calculate a corrective direction for the second user to move their field of view toward the corresponding field of view of the first user, and indicate the corrective direction within the current field of view that is output to the second user, as described elsewhere herein.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Accordingly, in a summary embodiment of the present description, video recording system 910 (such as for example a video games console, such as for example the PlayStation 5 ®, typically in conjunction with a head mounted display 810) comprises a rendering processor (such as GPU 912 and/or CPU 911) is configured (for example by suitable software instruction) to render a field of view of a virtual environment for a first user of a head mounted display at a first resolution, as described elsewhere herein. The rendering processor is also configured (again for example by suitable software instruction) to render a view of the virtual environment outside the field of view of the first user at a second lower resolution than the first resolution, as described elsewhere herein. This two-step rendering process may be sequential or in parallel, or may be part of a single process that differentiates resolution within a render dynamically, such as a flexible scale rasterisation scheme. An output processor (such as GPU 912, CPU 911 and/or input/output 914) is configured (again for example by suitable software instruction) to output the rendered field of view for display to the first user, as described elsewhere herein. In addition, a storage unit (such as a hard drive or solid-state drive or RAM, not shown, typically in conjunction with CPU 911 and/or GPU 9212) is configured (again for example by suitable software instruction) to record the combined render as a video for subsequent viewing by a second user, as described elsewhere herein.

Instances of this summary embodiment implementing the methods and techniques described herein (for example by use of suitable software instruction) are envisaged within the scope of the application including but not limited to that the system may comprise a server configured by suitable software instruction to increase the spatial and/or temporal resolution of the recording prior to distribution, as described elsewhere herein.

Similarly, in a summary embodiment present description, a video playback system 910 (such as for example a video games console, such as for example the PlayStation 5 ®, typically in conjunction with a head mounted display 810) is adapted to play video recording comprising a rendered field of view of a virtual environment of a first user of a head mounted display at a first resolution and a rendered view of the virtual environment outside the field of view of the first user at a second resolution lower than the first resolution, as described elsewhere herein, and the video playback system comprises the following.

A transmitter (such as input/output 914, optionally in conjunction with CPU 911) configured (for example by suitable software instruction) to transmit a request to download or stream the video from a remote source (such as for example a broadcast or streaming server hosting or relaying the video), as described elsewhere herein.

A receiver (such as input/output 914, optionally in conjunction with CPU 911) configured (for example by suitable software instruction), to receive the download or stream of the video from the remote source, as described elsewhere herein.

A graphics processor (such as GPU 912 and/or CPU 911) configured (for example by suitable software instruction) to output at least part of the stream or video for display to a second user (e.g. of the video playback system) wearing a head mounted display 810, as described elsewhere herein.

And the graphics processor is further configured (for example by suitable software instruction) to detect the field of view of the second user wearing the head mounted display (for example using any of the head motion tracking techniques described elsewhere herein), and provide the corresponding portion of the recorded stream or video for output to the head mounted display of the second user, as described elsewhere herein.

Instances of this summary embodiment implementing the methods and techniques described herein (for example by use of suitable software instruction) are envisaged within the scope of the application including but not limited to the graphics processor (such as GPU 912 and/or CPU 911) being configured to calculate, from data associated with the video recording (for example as meta data defining the field of view of the original first user within the video recording or a companion file), the relative position of the second user's current field of view to the corresponding field of view of the first user, as described elsewhere herein; and if the relative positions of these fields of view differ by more than the threshold amount, then to calculate a corrective direction for the second user to move their field of view toward the corresponding field of view of the first user; and indicate the corrective direction within the current field of view that is output to the second user, as described elsewhere herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of video recording, comprising the steps of:
rendering a field of view of a virtual environment for a first user of a head mounted display at a first resolution;
rendering a view of the virtual environment outside the field of view of the first user at a second lower resolution than the first resolution;
outputting the rendered field of view for display to the first user; and
recording a combined render as a video for subsequent viewing by a second user of a second head mounted display, the combined render comprising the rendered field of view of the virtual environment for the first user of the head mounted display at the first resolution and the rendered view of the virtual environment outside the field of view of the first user at the second resolution.

2. The method of claim 1, comprising the step of: rendering within the field of view a foveated region of the virtual environment, based on tracking the gaze of the first user, at a third resolution higher than the first resolution.

3. The method of claim 1, in which: the step of rendering a view of the virtual environment outside the field of view of the first user completes a spherical or cylindrical view of the virtual environment.

4. The method of claim 1, comprising the step of: rendering outside the field of view a transitional region bounding the rendered field of view and having one or more resolutions between the first and second resolutions.

5. The method of claim 4, in which: the size of the transitional region bounding the rendered field of view is dependent upon one or more of:
 i. difference in position of the rendered field of view between successive image frames;
 ii. the rate of change of position of the rendered field of view between successive image frames;
 iii. variance in position of the rendered field of view caused by micro-motions of the first user's head; and
 iv. expected variance in position caused by micro-motions of the second user's head.

6. The method of claim 1, comprising the step of: rendering, within the rendered view of the virtual environment outside the field of view of the first user, an object or event identified as being of interest within the environment, at a higher resolution than the second resolution, the remainder of the rendered view of the virtual environment outside the field of view of the first user remaining at the second resolution.

7. The method of claim 1, in which the step of rendering the view of the virtual environment outside the field of view of the first user is dependent upon selection of this function by one or more of:
 i. the first user;
 ii. an application rendering the virtual environment;
 iii. an operating system of the device rendering the virtual environment; and
 iv. a helper application for the operating system of the device rendering the virtual environment.

8. The method of claim 1, comprising the steps of:
obtaining the recorded video comprising the rendered field of view of the virtual environment of the first user of the head mounted display at the first resolution and the rendered view of the virtual environment outside the field of view of the first user at the second resolution lower than the first resolution; and
increasing one or more of:
 i. a spatial resolution of the recording of the rendered view of the virtual environment outside the field of view of the first user; and
 ii. a temporal resolution of the recording of the rendered view of the virtual environment outside the field of view of the first user.

9. A method of distributing a video recording recorded using the method of claim 1, the video recorded to comprise a rendered field of view of a virtual environment of a first user of a head mounted display at a first resolution and a rendered view of the virtual environment outside the field of view of the first user at a second resolution lower than the first resolution, the method comprising the steps of:
- receiving a request to download or stream the video recording to a second user; and
- downloading or streaming the video to the second user.

10. The method of distributing a video recording according to claim 9, comprising the step of: prior to distribution, increasing one or more of:
  i. a spatial resolution of the recording of the rendered view the virtual environment outside the field of view of the first user; and
  ii. a temporal resolution of the recording of the rendered view the virtual environment outside the field of view of the first user.

11. A method of viewing a video recording comprising a rendered field of view of a virtual environment of a first user of a head mounted display at a first resolution and a rendered view of the virtual environment outside the field of view of the first user at a second resolution lower than the first resolution, the method comprising the steps of:
- requesting to download or stream the video from a remote source;
- receiving the download or stream of the video from the remote source; and
- outputting at least part of the stream of video for display to a second user wearing a head mounted display,
- wherein the step of outputting the stream of video comprises:
- detecting the field of view of the second user wearing the head mounted display; and
- providing a corresponding portion of the recorded stream of video for output to the head mounted display of the second user, the corresponding portion of the recorded stream of video being the portion of the recorded stream of video that corresponds to the detected field of view of the second user.

12. The method of viewing a video recording according to claim 11, comprising the steps of:
- calculating, from data associated with the video recording, the relative position of the second user's current field of view to the corresponding field of view of the first user;
- if the relative positions of these fields of view differ by more than a threshold amount, then
- calculate a corrective direction for the second user to move their field of view toward the corresponding field of view of the first user; and
- indicate the corrective direction within the current field of view that is output to the second user.

13. A non-transitory, computer readable storage medium containing a computer program comprising computer executable instructions, which when executed by a computer system, causes the computer system to perform a method of video recording comprising the steps of:
- rendering a field of view of a virtual environment for a first user of a head mounted display at a first resolution;
- rendering a view of the virtual environment outside the field of view of the first user at a second lower resolution than the first resolution;
- outputting the rendered field of view for display to the first user; and
- recording a combined render as a video for subsequent viewing by a second user of a second head mounted display, the combined render comprising the rendered field of view of the virtual environment for the first user of the head mounted display at the first resolution and the rendered view of the virtual environment outside the field of view of the first user at the second resolution.

14. A video recording system, comprising:
- a rendering processor configured to render a field of view of a virtual environment for a first user of a head mounted display at a first resolution;
- the rendering processor being configured to render a view of the virtual environment outside the field of view of the first user at a second lower resolution than the first resolution;
- an output processor configured to output the rendered field of view for display to the first user; and
- a storage unit configured to record a combined render as a video for subsequent viewing by a second user of a second head mounted display, the combined render comprising the rendered field of view of the virtual environment for the first user of the head mounted display at the first resolution and the rendered view of the virtual environment outside the field of view of the first user at the second resolution.

15. A video playback system, adapted to play a video recording comprising a rendered field of view of a virtual environment of a first user of a head mounted display at a first resolution and a rendered view of the virtual environment outside the field of view of the first user at a second resolution lower than the first resolution, the video playback system comprising:
- a transmitter configured to transmit a request to download or stream the video from a remote source;
- a receiver configured to receive the download or stream of the video from the remote source; and
- a graphics processor configured to output at least part of the stream or video for display to a second user wearing a head mounted display,
- the graphics processor being configured to:
- detect the field of view of the second user wearing the head mounted display; and
- provide a corresponding portion of the recorded stream of video for output to the head mounted display of the second user, the corresponding portion of the recorded stream of video being the portion of the recorded stream of video that corresponds to the detected field of view of the second user.

* * * * *